United States Patent
Steele, Jr.

(10) Patent No.: US 6,629,239 B1
(45) Date of Patent: Sep. 30, 2003

(54) SYSTEM AND METHOD FOR UNPACKING AND MERGING BITS OF A DATA WORLD IN ACCORDANCE WITH BITS OF A MASK WORD

(75) Inventor: Guy L. Steele, Jr., Lexington, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/545,022

(22) Filed: Apr. 7, 2000

(51) Int. Cl.[7] .............................. G06F 7/00; G06F 9/00
(52) U.S. Cl. ..................... 712/300; 712/224; 708/209
(58) Field of Search ............................ 712/300, 224, 712/223, 225, 226, 204, 221, 222; 711/109; 708/200, 209, 400, 303, 505

(56) References Cited

U.S. PATENT DOCUMENTS

| | | | | |
|---|---|---|---|---|
| 4,583,199 A | * | 4/1986 | Boothroyd et al. | 712/300 |
| RE33,664 E | * | 8/1991 | Kang et al. | 711/109 X |
| 5,487,159 A | * | 1/1996 | Byers et al. | 712/223 |
| 5,682,340 A | * | 10/1997 | Arends et al. | 708/209 |
| 5,696,922 A | * | 12/1997 | Fromm | 711/5 |
| 5,995,748 A | * | 11/1999 | Guttag et al. | 712/221 |
| 6,098,087 A | * | 8/2000 | Lemay | 708/209 |

OTHER PUBLICATIONS

Hillis, W. Daniel & Steele, Guy L. Data Parallel Algorithms, *Communications of the ACM*, Dec. 1986, vol. 29, No. 12, pp. 1170–1183.

* cited by examiner

*Primary Examiner*—Henry W. H. Tsai
(74) *Attorney, Agent, or Firm*—Cesari and McKenna LLP (57) ABSTRACT

A system is described for rearranging an input data word in relation to a mask word, the data word comprising a plurality of input data units in a series of input data unit positions, each associated with a respective one of a plurality of bits of the mask word in a series of mask bit positions, each mask bit having one of a plurality of conditions, to provide an output data word comprising a plurality of output data units in a series of output data unit positions. The system comprises a control module and a shift module. The control module is configured to identify, for each output data unit position, the number of bits in bit positions in the mask word to one end of that bit position which have one of the conditions, and the number of bits in bit positions to another end of the mask word have another of the conditions. The shift module is configured to shift the input data units from their respective input data unit positions each of the bit positions into the respective output data unit positions in response to the identifications generated by the control module and the conditions of the respective mask bits.

23 Claims, 3 Drawing Sheets

SYSTEM AND METHOD FOR UNPACKING AND MERGING BITS OF A DATA WORLD IN ACCORDANCE WITH BITS OF A MASK WORD

CROSS-REFERENCE TO RELATED APPLICATION

This application is related to U.S. patent application Ser. No. 09/545,020, which was filed on Apr. 7, 2002 by Guy L. Steele Jr. for a System and Method for Arranging Bits of a Data Word in Accordance with a Mask.

FIELD OF THE INVENTION

The invention relates generally to the field of digital computers and more specifically to functional units for processing predetermined types of instructions. The invention particularly provides a circuit or functional unit for use in connection with execution of an instruction for rearranging bits of a data word in accordance with a mask.

BACKGROUND OF THE INVENTION

Computers process data in accordance with instructions. One type of instruction which has been proposed is a so-called "mingle" instruction which accepts as operands a data word and a mask word and rearranges the bits of the data word in accordance with the mask word. In the rearranged data word, the bits of the data word in bit positions towards the left end of the data word are distributed to bit positions which correspond to bit positions of the mask whose bits are clear, or have the value "zero," and the bits of the data word in bit positions to the right end of the data word are distributed to bit positions which correspond to bit positions of the mask whose bits are set, while maintaining order of the bits of the data word in each group. For example, if an eight bit data word has the value "abcdefgh" (where the letters represent binary integers having the value "one" or "zero"), and the mask word corresponds to "10011011," in the rearranged data word generated when the "mingle" instruction is executed with these as operands, since three of the eight mask bits are clear the leftmost three bits "a," "b" and "c" of the data word will be distributed to the bit positions of the mask word which are clear, and since five of the mask bits are set the rightmost bits "d" through "h" will be distributed to the bit positions of the mask word which are set, preserving order in each group, providing output "dabefcgh."

In a variant of the "mingle" instruction, the bits of the rearranged data word in bit positions for which the bits of the mask are either set or clear (but preferably not both) will be set to a predetermined value. Generally, it has been proposed that, for example, the bits of the rearranged data word in bit positions for which the bits of the mask are clear will be set to zero, but the variant may be used with either group, and the predetermined value may be either "one" or "zero."

A "mingle" instruction can find utility in connection with, for example, performing various bit permutations, for example, using a mask consisting of alternating set and clear bits will result in a so-called "shuffle" permutation of a data word.

SUMMARY OF THE INVENTION

The invention provides a new and improved circuit or functional unit for use in connection with execution of an instruction for rearranging bits of a data word in accordance with a mask.

In brief summary, the invention provides a system for rearranging an input data word in relation to a mask word, the data word comprising a plurality of input data units in a series of input data unit positions, each associated with a respective one of a plurality of bits of the mask word in a series of mask bit positions, each mask bit having one of a plurality of conditions, to provide an output data word comprising a plurality of output data units in a series of output data unit positions. The system comprises a control module and a shift module. The control module is configured to identify, for each output data unit position, the number of bits in bit positions in the mask word to one end of that bit position which have one of the conditions, and the number of bits in bit positions to another end of the mask word have another of the conditions. The shift module is configured to shift the input data units from their respective input data unit positions each of the bit positions into the respective output data unit positions in response to the identifications generated by the control module and the conditions of the respective mask bits.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1A:
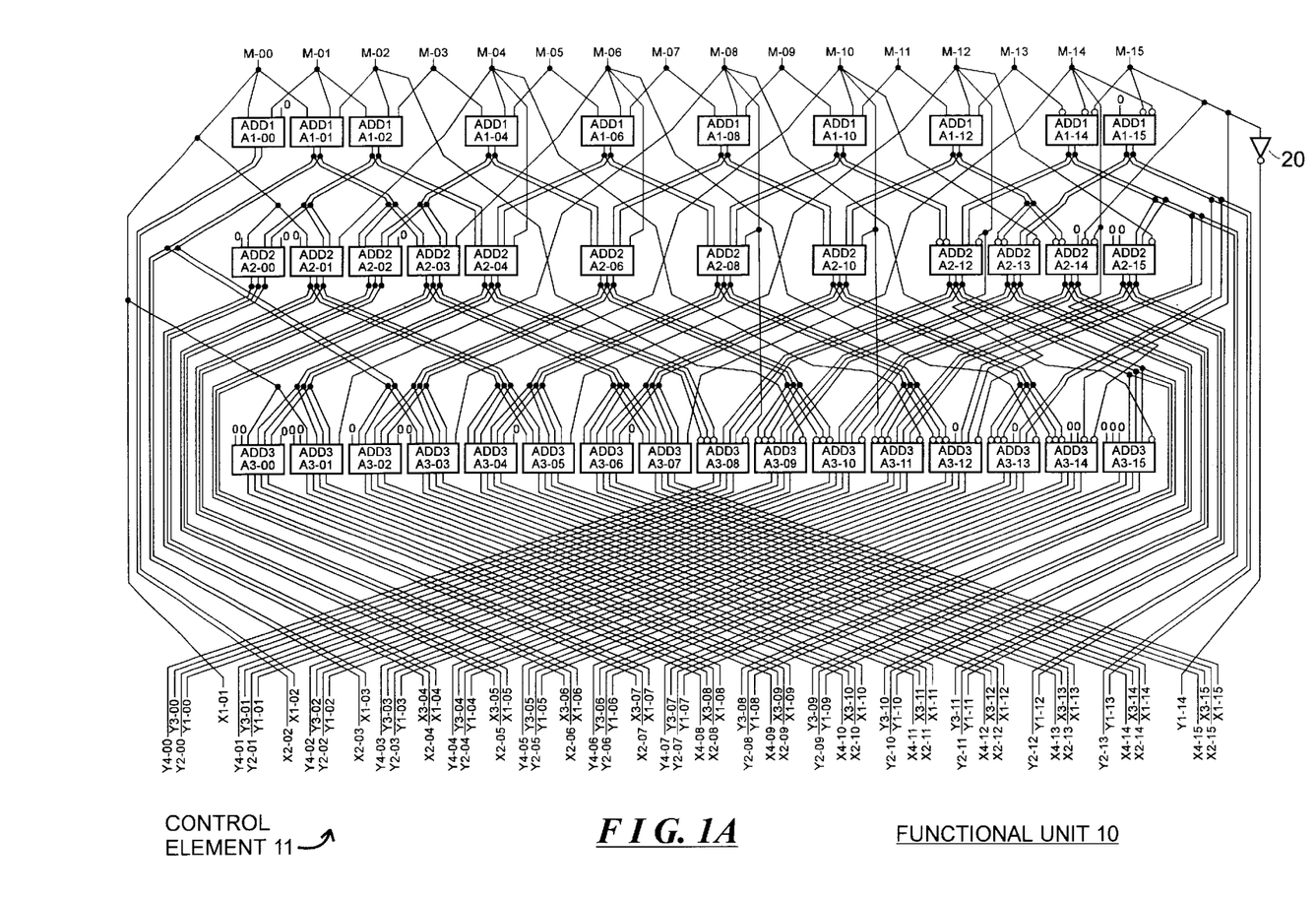
FIGS. 1A and 1B together depict a functional block diagram of a circuit or functional unit for use in connection with execution of an instruction for rearranging bits of a data word in accordance with a mask, in accordance with the invention.
Figure 1B:
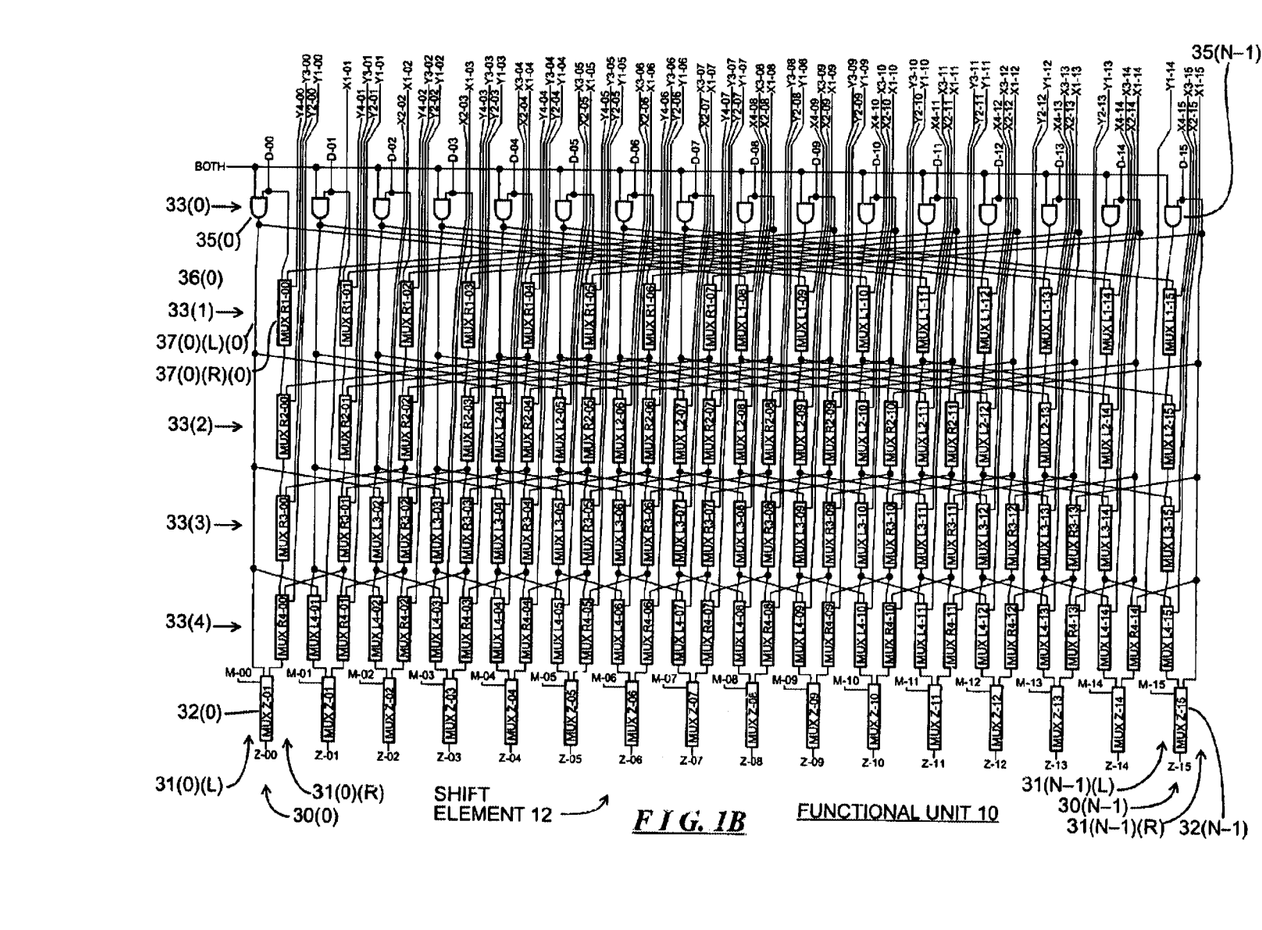

FIGS. 1A and 1B together depict a functional block diagram of a circuit or functional unit 10 for use in connection with execution of an instruction for rearranging bits of a data word in accordance with a mask, in accordance with the invention. The functional unit 10 generally comprises two elements, including a control element 11, depicted on FIG. 1A, and a shift element 12, depicted on FIG. 1B. Generally, the functional unit 10 executes a "mingle" instruction, which accepts as operands an "N"-bit data word, comprising data bits in bit positions D0, . . . DN−1 (generally identified by reference numeral Dn), and an "N"-bit mask word, comprising mask bits in bit positions M0, . . . , MN−1 (generally identified by reference numeral Mn) and rearranges the bits of the data word in accordance with the mask word to provide a rearranged data word comprising rearranged data bits in bit positions Z0, . . . , ZN−1 (generally identified by reference numeral Zn) in which (i) the bits in bit positions D0, . . . , Dn of the data word in bit positions towards the left end of the data word are distributed to bit positions Zn in the rearranged data word which correspond to bit positions of the mask word whose bits are clear, or have the value "zero," and (ii) the bits in bit positions Dn+1, . . . , DN−1 of the data word in bit positions to the right end of the data word are distributed to bit positions Zn in the rearranged data word which correspond to bit positions of the mask whose bits are set, while maintaining order of the bits of the data word in each group. Thus it will be appreciated that, in the rearranged data word, for a bit position "k,"

(a) if the "k"-th bit position of the mask word has a mask bit in bit position Mk which is clear, in the rearranged data word the bit in bit position Zk will correspond to the bit in bit position Dk' of the original data word, where k–k' corresponds to the number of bits of the mask word to the left of bit position "k" which are set; otherwise stated, the bit in bit position Dk' of the original data word will be shifted to the right into bit position Zk of the rearranged data word by a number of bit positions corresponding to the number of mask bits in bit positions M0, ..., Mk–1 to the left of bit position Mk which are set, but (b) if the "k"-th bit position of the mask word has a mask bit in bit position Mk which is set, in the rearranged data word the bit in bit position Zk will correspond to the bit in bit position Dk" of the original data word, where k"–k corresponds to the number of bits of the mask word to the right of bit position "k" which are clear; otherwise stated, the bit in bit position Dk" of the original data word will be shifted to the left, into bit position Zk of the rearranged data word, by a number of bit positions corresponding to the number of mask bits in bit positions Mk+1, ..., MN–1 to the right of bit position Mk which are clear.

Accordingly, the control element 11 identifies, for each bit position Zk in the rearranged data word, the number of bits in bit positions M0, ..., Mk–1 in the mask word to the left of that bit position Zk which are set, and in addition the number of bits in bit positions Mk+1, ..., MN–1 in the mask to the right of that bit position Zk which are clear. The information generated by the control element 11 is expressed in control signals which control the shift element 12, which, in turn, shifts the bits in bit positions Dn of the data word from each of the bit positions into the correct bit position of the rearranged data word. In particular, the shift element 12, for each bit position Zk of the rearranged data word, shifts both bits in bit positions Dk' and Dk" and selects one of the bits in bit positions Dk' and Dk" as the appropriate bit in bit position Zk based on whether the mask bit in bit position Mk is clear or set.

The functional unit 10 specifically depicted in FIGS. 1A and 1B is for use with data words and masks, having sixteen bit positions D0 through D15 (generally Dn) and M0 through M15 (generally Mn) respectively, but it will be appreciated that the number "N" of bit positions may comprise any convenient number.

Generally, the control element 11 generates, for each bit in bit position Mn of the mask word, a value identifying the number of mask bits in bit positions M0 through Mn–1 to the left of mask bit in bit position Mn which are set (that is, which have the value 1), and a value identifying the number of mask bits in bit positions Mn+1 through M15 to the right of mask bit in bit position Mn which are clear (that is, which have the value 0).

With reference to FIG. 1A, the control element 11 depicted therein comprises a plurality of adders arranged in three stages, with (i) adders in the first stage being identified by reference numerals A1-00 through A1-02, A1-04, A1-06, A1-08, A1-10, A1-12, A1-14 and A1-15

(ii) adders in the second stage being identified by reference numerals A2-00 through A2-04, A2-06, A2-08, A2-10, and A2-12 through A2-15, and (iii) adders in the third stage being identified by reference numerals A3-00 through A3-15.

In the first stage, each adder A1-n (where "n" ranges over 1, 1, 1, 4, 6, 8, 10 and 12) receives the mask bit from bit positions Mn–1, Mn and Mn+1 (if any) and generates a value identifying the number of bits in those bit positions which are set (one). Accordingly, it will be appreciated that each adder A1-n effectively identifies the number of bits in the three bit positions (if any) to the left of bit position Mn+2 in the mask which are set (one). It will be appreciated that the adder A1-00 only identifies the number of bits in the two bit positions to the left of bit position M2 which are set (one). In addition, the mask bit in bit position M0 itself identifies the number of bits in the one bit position to the left of bit position M1 which is set, and there are no bits to the left of bit position M0.

On the other hand, adders A1-15 and A1-14 identify the number of bits in the three bit positions to the right of bit positions M13 and M12, respectively, which are clear (zero). In particular each adder A1-n (where "n" equals 15 or 14) receives the mask bits from bit positions Mn+1, Mn and Mn–1 (if any), complements them and generates a value identifying the number of bits in those bit positions which are clear (zero). Accordingly, it will be appreciated that each adder A1-n effectively identifies the number of bits in the three bit positions (if any) to the right of bit position Mn–2 which are clear (zero). It will be appreciated that adder A1-15 only identifies the number of bits in the two bit positions to the right of bit position M13 which are clear (zero). In addition, the complement, generated by an inverter 20, of the mask bit in bit position M15 itself identifies the number of bits in the one bit position to the right of bit position M14 which are clear, and there are not bits to the right of bit position M15.

In the second stage, each adder A2-n (where "n" ranges from 0 through 4, 6, 8 and 10) receives selected ones of the values generated by adders A1-00 through A1-02, A1-04, A1-06, A1-08, A1-10 and A1-12, and selected ones of the mask bits in bit positions M0, M4, M6, M8, M10 and M12, and generates a value identifying the number of bits in a series of seven bit positions are set (one). In particular, for example, adder A2-00 receives the value generated by adder A1-02, and the mask bit in bit position M0. As described above, adder A1-02 generates a value that identifies the number of mask bits in bit positions M1 through M3 which are set (one). In addition, the mask bit in bit position M0 itself serves to indicates whether the mask bit in bit position M0 is set, and, accordingly, the value generated by adder A2-00 identifies the number of mask bits to the left of bit position M4 which are set (one). Similarly, adders A2-01 through A2-03 generate respective values that identify the number of mask bits to the left of bit positions M5 through M7 which are set, and adders A2-04, A2-06, A2-08, and A2-10 generate respective values that identify the number of bits in overlapping sequences of bit positions M1-M7, M3-09, M5-M11 and M7-M13, thereby identifying the number of bits in each seven-bit sequence to the left of bit positions M8, M10, M12 and M14 which are set (one).

On the other hand, in the second stage, each adder A2-n (where "n" ranges from 12 through 15), receives selected ones of the values generated by adders A1-14 and A1-15, the complements of the values generated by the adders A1-10 and A1-12, and the complements of the mask bits from bit positions M0, M12 and M14. It will be appreciated that, since the values generated by adders A1-10 and A1-12 identify the number of mask bits in bit positions M9 through M11 and M11 through M13, respectively, which are set, the complements of the values generated by adders A1-10 and A1-12 effectively identify the number of mask bits in those bit positions which are clear. Accordingly, the adders A2-12 through A2-15 generate values identifying the number of mask bits to the right of bit positions M8, M9, M10 and M11, respectively, which are clear (zero).

In the third stage, each adder A3-n (where "n" ranges from 00 through 07) receives selected ones of the values generated by adders A1-01, A2-04, A2-06, A2-08, and A2-10, and selected ones of the mask bits in bit positions M0, M8, M10, M12 and M14, and generates respective values that identify the number of bits to the left of respective bit positions M8 through M15 which are set (one). For example, adder A3-00 receives the value generated by adder A2-04 and the mask bit in bit position M0. As noted above, the value generated by adder A2-04 identifies the number of bits in bit positions M1 through M7 which are set, and adding that value to the mask bit in bit position M0 indicates the number of bits in bit positions M0 through M7 which are set. Thus, the value generated by adder A2-04 identifies the number of bits in bit positions to the left of bit position M8 which are set. Similarly, adder A3-01 receives the value generated by the adder A2-04 and the mask bit in bit positions M0 through M8, and generates a value that identifies the number of bits in bit positions M0 through M8 which are set, which, in turn, corresponds to the number of bits to the left of bit position M9 which are set. Adder A3-02 receives the value generated by adders A1-01 and A2-06. As noted above, the adder A1-01 generates a value that identifies the number of bits in bit positions M0 through M3 which are set, and adder A2-06 generates a value that identifies the number of bits in bit positions M3 through M9 which are set. Accordingly, the value generated by adder A3-02 identifies the number of bits in bit positions M0 through M9 which are set, which, in turn corresponds to the number of bits in bit positions to the left of bit position M10 which are set. That the other adders A3-03 through A3-07 generate values that identify the number of bits to the left of respective bit positions M11 through M15 which are set will be apparent to those skilled in the art.

Similarly, each adder A3-n (where "n" ranges from 08 through 15) receives and complements selected ones of the values generated by adders A2-04, A2-06, A2-08 and A2-10 and selected one of the mask bits in bit positions M2, M4, M6, M8, M10, and M12, M14 and M15, and further receives (without complementing) selected ones of the values generated by adders A2-12 through A2-15, A1-14, and A1-15 and generates respective values that identify the number of bits to the right of respective bit positions M0 through M7 which are clear (zero). For example, adder A3-15 receives the value generated by adder A2-12, and receives and complements the mask bit in bit position M8. As noted above, the value generated by adder A2-12 identifies the number of mask bits in bit positions M9 through M15 which are clear, and adding that value to the complement of the mask bit in bit position M8 identifies the number of mask bits in bit positions M8 through M15 which are clear, which, in turn, corresponds to the number of bits to the right of bit position M7 which are clear. Similarly, adder A3-14 receives and complements the value generated by adder A2-10 and the mask bits in bit positions M14 and M15. Since the adder A2-10 generates a value which identifies the number of bits in bit positions M7 through M13 which are set, the complement of the value generated by adder A2-10 identifies the number of bits in bit positions M7 through M13 which are clear. Similarly, the complements of the mask bits in bit positions M14 and M15 identify whether those mask bits are clear, and so the sum of the complements of the value generated by adder A2-10 and the mask bits in bit positions M14 and M15 identifies the number of bits in bit positions M7 through M15 which are clear, which, in turn identifies the number of mask bits to the right of bit position M6 which are clear. That the other adders A3-08 through A3-13 generate values that identify the number of mask bits to the right of respective bit positions M0 through M5 which are clear, will be apparent to those skilled in the art.

In general, the control circuit 11,
(i) in identifying the number of bits to the left of respective bit positions which are set,
  (a) the mask bit in the leftmost bit position M0 identifies the number of bits to the left of the second leftmost bit position M1 which are set, and
  (b) in each stage, the leftmost $2^j$ (where "j" identifies the stage 1, 2 or 3) adders identify the number of bits to the left of respective bit positions which are set, with the adders in successive stages identifying the number of bits to the left of successive ones of the bit positions which are set; that is, the leftmost two adders in the first stage identifying the number of bits to the left of bit positions M2 and M3 which are set, the leftmost four adders in the second stage identifying the number of bits to the left of bit positions M4 through M7 which are set, and the leftmost eight adders in the third stage identifying the number of bits to the left of bit positions M8 through M15 which are set; similarly,
(ii) in identifying the number of bits to the right of respective bit positions which are clear,
  (a) the complement of the mask bit in the rightmost bit position M15 identifies the number of bits to the right of the second rightmost bit position which are clear, and
  (b) in each stage, the rightmost $2^j$ (where "j" identifies the stage 1, 2 or 3) adders identify the number of bits to the right of respective bit positions which are clear, with the adders in successive stages identifying the number of bits to the right of successive ones of the bit positions which are clear; that is, the rightmost two adders in the first stage identifying the number of bits to the right of bit positions M13 and M12 which are set, the rightmost four adders in the second stage identifying the number of bits to the right of bit positions M11 through M8 which are clear, and the rightmost eight adders in the third stage identifying the number of bits to the right of bit positions M7 through M0 which are clear.

The other adders in the respective stages generate values which are used by the adders in the subsequent stages to generate the values as indicated above.

As noted above, the control element 11 generates control signals which are used by the shift element 12 to shift the bits in bit positions Dn of the data word into the correct bit positions Zn of the rearranged data word as determined by the bits in bit positions Mn of the mask word. The control signals comprise a signal representative of the state of the M0 bit of the mask word, and the outputs of adders A1-00, A1-01, A2-00 through A2-03, and A3-00 through A3-07, which above, respectively identify the number of bits of the mask word to the left of respective bit positions M1 through M15 which are set, and a signal representative of the complement of the M15 bit of the mask word, and the outputs of adders A1-15, A1-14, A2-15 through A2-12, and A3-15 through A3-08, which, as noted above, respectively identify the number of bits of the mask word to the right of respective bit positions which are clear. The output of each adder comprises a plurality of signals (two each for adders A1-00, A1-01, A1-14 and A1-15, three each for adders A2-00 through A2-03 and A2-12 through A2-15 and four each for adders A3-00 through A3-15), which represent a binary-encoded value, which signals are permuted into sixteen sets of control signals Y4-00, Y3-00, Y2-00 and Y1-00 (which together will be referred to as set S0) through X4-15, X3-15, X2-15 and X1-15 (which together will be referred to as set S15). Before describing the manner in which the outputs of the adders and the signals representative of the states of the M0 and complement of the M15 bits of the mask word are permuted into the various sets of control signals, it would be helpful to describe the shift element 12 as depicted in FIG. 1B.

With reference to FIG. 1B, the shift element 12 comprises sixteen columns 30(0) through 30(15) (generally identified by reference numeral 30(n)), each of which receives one of the bits in bit positions Dn of the data word and provides one of the shifted bits in bit positions Zn of the rearranged data word. Each column 30(n) consists of two series of shift elements, one of which, identified as left shift series 31(n) (L), is used to control shifting to the left, and the other, identified as right shift series 31(n)(R), is used to control shifting to the right. If a bit in bit position Dn of the data word is not to be shifted, the bit in bit position Dn sequences through either the left shift series 31(n)(L) or the right shift series 31(n)(R) of the respective column 30(n). Essentially, the shift element 12 comprises two shifters, including the right shift series and left shift series, with each column 30(n) further including a respective multiplexer 32(n) to provide a single output signal Zn therefor. In each column 30(n), the left shift series 31(n)(L) controls the shifting of a bit into a column from a column 30(n') that is to the left (that is, n'<n) of column 30(n) and the right shift series 31(n)(R) controls the shifting of a bit into a column from a column 30(n") that is to the right (that is, n">n). Generally, the left shift series 31(n)(L) controls shifting of data bits in bit positions Dn from the left end of the data word into bit positions of the output data word Zn corresponding to bit positions of the mask word for which for which the mask bits in bit positions Mn are clear. Similarly, the right shift series 31(n)(L) controls shifting of data bits from the right of the data word into bit positions of the output data word Zn corresponding to bit positions of the mask word for which the mask bits in bit positions Mn are set. In each case, the left and right shift series 30(n)(L) and 30(n)(R) selects between the bit currently in the respective left and right shift series 30(n)(L) and 30(n) and the column to the left or right, respectively.

Within the shift element 12, each column 30(n) comprises a series of shift control elements which facilitate the shifting of a data bit in bit position Dn into the column from the right (in the case of the left shift series 31(n)(L)), or the left (in the case of the right shift series 31(n)(R)) in a series of shift stages 33(0) through 33(4) (generally 33(0) through 33(S), or 33(s), where S=4 for the number of data bits N=16). The input stage 33(0) distributes each data bit in bit position Dn to the inputs of the left shift series 31(n)(L) and 31(n+8) in the columns 30(n) and 30(n+8) (if one exists and if a BOTH signal is asserted), and the inputs of the right shift series 31(n−8)(R) and 31(n)(R) in the columns 30(n−8) and 30(n) (if one exists). The BOTH signal is provided to control shifting of the data bits in bit positions Dn which are to be shifted using the left shift series 31(n)(L) in each column 30(n), which, as noted above, will be the case if they are to be shifted to bit positions for mask bits in bit positions Mn which are clear. In that case, the BOTH signal is asserted, allowing data bits in bit positions Dn to be coupled from their respective inputs to the respective left shift series 31(n)(L) of respective columns 30(n). On the other hand, if only data bits are to be shifted to bit positions for mask bits in bit positions Mn which are set, the BOTH signal will be negated, which blocks coupling of signals associated with the data bits in bit positions Dn to the left shift series 31(n)(L) of all of the columns 30(n), thereby insuring that all of the data bits which are to be shifted to bit positions for which mask bits in bit positions Mn which are clear, and therefor to be shifted using the left shift series 31(n)(L) of all the columns 30(n), are set to zero. In either case, the data bits in bit positions Dn are coupled to the right shift series 31(n)(R) of the respective columns 30(n), which will ensure that the data bits in bit positions Dn which are to be shifted to bit positions for which mask bits in bit positions Mn are set will be so shifted. The input stage is implemented as a series of AND gates 35(n) each associated with a respective column 30(n), which control the coupling of each data bit in bit position Dn to the left shift series 31(n)(L) in the respective column. If the BOTH signal is asserted, the AND gates 35(n) couple the data bits in bit positions Dn to the left shift series 31(n−1)(L) and 31(n)(L) of both the corresponding column 30(n) and column 30(n+8) (if column 30(n+8) exists). On the other hand, if the BOTH signal is negated, the AND gates 35(n) block the data bits in bit positions Dn from being coupled to the left shift series 31(n)(L) and 31(n+8)(L) of the respective columns 30(n) and 30(n+8), and instead provide signals to those left shift series corresponding to the value "zero."

The operation of the left and right shift control elements 37(n)(L)(s) and 37(n)(R)(s) in the respective shift stages 34(s), for s=1, . . . , S, will be essentially similar regardless of the condition of the BOTH signal. Accordingly, in the following, it will be assumed that the BOTH signal is asserted, and that data bits in bit positions Dn are to be shifted from the left end of the data word to respective output bit positions Zn which are associated with bit positions of the mask word for which mask bits in bit positions Mn are clear. Each of the left and right shift control elements 37(n)(L)(s) and 37(n)(R)(s) in the shift stages 33(s), s=1, . . . , S, comprises either a through connection or a multiplexer. If the left or right shift control element 37(n) (L)(s) or 37(n)(R)(s) is a through connection, it couples the data bit received at its input from the input stage 33(0) or the respective left or right shift control element 37(n)(L)(s−1) or 37(n)(R)(s−1) of the preceding shift stage 33(s−1), to the respective left or right shift control element 37(n)(L)(s+1) or 37(n)(R)(s+1) of the same column 30(n), and, for shift control elements in stages 33(0) through 33(S−1) to the respective left or right shift control element $37(n+2^{S-s-1})$ (L)(s+1) or $37(n-2^{S-s-1})$(R)(s+1), thereby to facilitate shifting of the data bit input thereto to a column to the right (in the case of a left shift control element) or left (in the case of a right shift control element). In the last shift stage 34(S), the through connections couple the data bit input thereto to the output multiplexer 32(n).

On the other hand, if the left or right shift control element 37(n)(L)(s) or 37(n)(R)(s), s=1, . . . , S is a multiplexer, the multiplexer selectively couples one of two of data bits from respective columns in the preceding shift stage 33(s−1) to the next stage 33(s+1), in the case of the shift stages 34(0) through 33(S−1), or an output multiplexer 32(n), in the case of the last shift stage 33(S). For a left shift control element 37(n)(L)(s), the multiplexer selectively couples data bits from the correspondingly-indexed column 30(n) and from a column $30(n-2^{S-s})$ to its left, thereby to facilitate shifting of the data bit to the right into the column 30(n). In the case of the shift stage 33(1), each multiplexer comprising a left shift control element 37(8)(L)(1) through 37(15)(L)(1) receives signals representing data bits from AND gates 35(n−8) and 35(n)(illustratively, AND gates 35(0) and 35(8) in the case of left shift control element 37(8)(L)(N)). In the case of shift stages 33(2) and 33(3), each multiplexer comprising a left shift control element 37(n)(L)(s) receives signals representing data bits from the left shift control element 37(n)(L)(s−1) in the same column 30(n) and the left shift control element 37(n−$2^{S-s}$) in the respective column 30(n−4) (in the case of the shift stage 33(2)) or column 30(n−2) (in the case of shift stage 33(3)). Each multiplexer comprising a left shift control element 37(n)(L)(s) in shift stages 32(1) through 33(3) further provides its respective output to the left shift control element 37(n)(L)(s+1) in the same column 30(n), and the left shift control element 37(n+$2^{S-s-1}$)(L)(s+1) in the column 30(n+$2^{S-s-1}$) to the right of column 30(n), the latter to facilitate a shift of the bit to the right (which corresponds to a shift into column 30(n+$2^{S-s-1}$) from the left). Finally, in the case of shift stage 33(S), each multiplexer comprising a left shift control element 37(n)(L)(S) receives signals representing data bits from the left shift control element 37(n)(L)(s−1) in the same column 30(n) and the left shift control element 37(n−1) in the respective column 30(n−1) (it will be appreciated that column 30(n−1) corresponds to column 30(n−$2^{S-s}$) for s=S) and selectively couples one of the signals input thereto to the multiplexer 32(n) of the respective column 30(n).

Similarly, for a right shift control element 37(n)(R)(s), the multiplexer selectively couples data bits from the correspondingly-indexed column 30(n+$2^{S-s}$) and from a column 30(n+$2^{S-s}$) to its right, thereby to facilitate shifting of the data bit to the left into the column 30(n). In the case of the shift stage 33(1), each multiplexer comprising a right shift control element 37(0)(R)(1) through 37(7)(R)(1) receives signals representing data bits from the input stage 33(0). In the case of shift stages 32(2) and 33(3), each multiplexer comprising a right shift control element 37(s) receives signals representing data bits from the right shift control element 37(n)(R)(s−1) in the same column 30(n) and the right shift control element 37(n+$2^{S-s}$) in the respective column 30(n−4) (in the case of the shift stage 33(2)) or column 30(n+2) (in the case of 33(3)). Each multiplexer comprising a right shift control element 37(n)(R)(s) in shift stages 33(1) through 33(3) further provides its respective output to the right shift control element 37(n)(R)(s+1) in the same column 30(n), and the right shift control element 37(n−$2^{S-S-1}$)(L)(s+1) in the column 30(n−$2^{S-s-1}$) to the right of column 30(n), the latter to facilitate a shift of the bit to the left (which corresponds to a shift into column 30(n−$2^{S-s}$) from the right). Finally, in the case of shift stage 33(S), each multiplexer comprising a right shift control element 37(n)(R)(S) receives signals representing data bits from the right shift control element 37(n)(R)(s−1) in the same column 30(n) and the right shift control element 37(n+1)(R)(s−1) in the respective column 30(n+1)(R)(s−1) (it will be appreciated that column 30(n+1) corresponds to column 30(n+$2^{S-s}$) for s=S) and selectively couples one of the signals input thereto the multiplexer 32(n) of the respective column 30(n).

Finally, each multiplexer 32(n) in the respective column 30(n) selectively couples the signal provided thereto by the left or right shift control element 37(n)(L)(S) or 37(n)(R)(S) in the last shift stage 33(S) as the output data bit in bit position Zn, with the selection being controlled by the value of the mask bit in bit position Mn in the corresponding "n-th" bit position of the mask word.

It will be appreciated that each left and right shift control element 37(n)(L)(s) and 37(n)(R)(s) in each column 30(n) and shift stage 33(s) which comprises a through connection is in a column 30(n) and shift stage 33(s) for which the shift element 12 does not have a column 30(n−$2^{S-s}$) to the left, in the case of left shift control elements 37(n)(L)(s), or a column 30(n+$2^{S-s}$) to the right, in the case of right shift control elements 37(n)(R)(s).

Returning to FIG. 1A, as noted above, the control element 11 generates, for each bit in bit position Zk of the rearranged data word, a value identifying the number of mask bits in bit positions M0 through Mk−1 to the left of mask bit in bit position Mn which are set and a value identifying the number of mask bits in bit positions Mk+1 through M15, to the right of mask bit in bit position Mk which are clear (that is, which have the value 0). These values are used to shift data bits from the data word Dn into the appropriate bit positions Zn of the output data word. These values are expressed as the signal representative of the state of the bit in the M0 bit position of the mask word, the outputs of adders A1-00, A1-01, A2-00 through A2-03, A3-00 through A3-15, A2-15 through A2-12, A1-15 and A1-14, and the signal representative of the complement of the state of the bit in bit position M15 of the mask word. From these signals, the control element provides a number of sets of control signals which will be referred to Y4-00, Y3-00, Y2-00 and Y1-00 (which together will be referred to as right set RS0) through Y1-14 (which will be referred to as right set RS14), which control the right shift control elements 37(n)(R)(s), and X4-15, X3-15, X2-15 and X1-15 (which together will be referred to as left right LS15) through X1-01 (which will be referred to as left set LS-01), which are used to control the left shift control elements 37(n)(L)(s), thereby to effect a shift of a data bit into a column from the left and right, respectively. Generally, the control signals X4-n and Y4-n are applied to the respective left or right shift control element 37(n)(L)(1) or 37(n)(R)(1) in the second shift stage 33(1)(that is, the first shift stage which contains multiplexers), the control signals X3-xx and Y3-xx are applied to the respective left or right shift control element 37(n)(L)(2) or 37(n)(R)(2) in the third shift stage, and so forth.

As noted above, for any bit position Zk of the rearranged data word, if the mask bit in bit position Mk in the corresponding bit position is clear, the data bit shifted into the bit position will correspond to the data bit in bit position Dk' of the input data word, where k–k' corresponds to the number of mask bits in bit positions M0 through Mk−1 to the left of bit position Mk which are set. Similarly, if the mask bit in bit position Mk is set, the data bit shifted into the bit position Zk of the rearranged data word will correspond to the data bit in bit position Dk" of the input data word, where k"−k corresponds to the number of mask bits in bit positions Mk+1 through MN−1 to the right of bit position Mk which are clear. And further, as described above in connection with FIG. 1B, the shift element 12 shifts the data bits in bit positions Dn in a series of stages, with the shift among the columns being in decreasing powers of two; thus, the successive control signals Y4-xx, Y3-xx, . . . , and X4-xx, X3-xx, . . . , are applied to control shifting between columns which are separated by distances of successively decreasing powers of two.

It should be noted that, when a data bit is shifted into one column 30(n) from another column 30(n') in a shift stage 33(s), the data bit in column 30(n) may not be the data bit that was originally in bit position Dn' in the data word. The total displacement, that is, the number of bit positions k–k' or k"–k, that the data bit is to travel from the input to the output is governed, not necessarily by the control signals in column 30(k), but perhaps by control signals applied in a plurality of columns as the data bit is transferred from column 30(k') or column 30(k") to column 30(k). However, it is a property of the functional unit 10 that, when a data bit is shifted into one column 30(n) from another column 30(n') in a shift stage 33(s) in response to a control signal Y(S-s)-xx or X(Ss)-xx, it has already been shifted by the appropriate number of columns in preceding shift stages 33(0), . . . , 33(s−1), if any, in response to higher-order control signals which control those preceding shift stages.

This will be illustrated by the following example. Suppose that the adder A3-07 determines that the number of bits of the mask word to the left of bit position M15 that are set is fifteen. In that case, the adder A3-07 will generate control signals X4-15 through X1-15, all of which are asserted. Those control signals will control the multiplexers comprising the left shift control elements 37(15)(L)(1) through 37(15)(L)(4) to shift data bits from, respectively, (i) column 30(7), from AND gate 35(7), in shift stage 33(1), resulting in a shift of eight (that is $2^3$) columns;

(ii) column 30(11), from the multiplexer comprising left shift control element 37(11)(L)(2), in shift stage 33(2), resulting in a shift of four (that is, $2^2$) columns, (iii) column 30(13), from the multiplexer comprising left shift control element 37(13)(L)(3), in shift stage 33(3), resulting in a shift of two (that is, $2^1$) columns, and (ii) column 30(14), from the multiplexer comprising left shift control element 37(14)(L)(4), in shift stage 33(4), resulting in a shift of one (that is, $2^0$) column. However, it should be noted that, since the adder A3-07 has determined that fifteen bits of the mask word to the left of bit position M15 are set, (a) the adder A3-00 will also determine that eight bits of the mask word to the left of bit position M8 are set, in which case the high-order control signal X4-08 will be asserted, which, in turn, enables the multiplexer comprising left shift control element 37(8)(L)(1) in the shift stage 33(1) to shift the data bit in bit position D0 into column 30(8), (b) the adder A3-04 will determine that twelve bits of the mask word to the left of bit position M12 are set, in which case the second order control signal X3-12 will be asserted, which, in turn, enables the multiplexer comprising left shift control element 37(12)(L)(2) in shift stage 33(2) to shift, into column 30(12), the data bit from column 30(8), which, as noted above in connection with (a), corresponds to the data bit from bit position D0 of the original data word;

(c) the adder A3-06 will determine that fourteen bits of the mask word to the left of bit position M14 are set, in which case the control signal X2-14 will be asserted, which, in turn, enables the multiplexer comprising left shift control element 37(14)(L)(3) in shift stage 33(3) to shift, into column 30(14), the data bit from column 30(12), which, as noted above in connection with (b), corresponds to the data bit from bit position D0 of the original data word; and (d) as noted above, the adder A3-07 will determine that fifteen bits of the mask word to the left of bit position M15 are set, in which case the control signal X1-15 will be asserted, which, in turn, enables the multiplexer comprising left shift control element 37(15)(L)(4) in shift stage 33(4) to shift, into column 30(15), the data bit from column 30(14), which, as noted above in connection with (c), corresponds to the data bit from bit position D0 of the original data word. If the mask bit in bit position M15 is clear, the output multiplexer 32(15) will couple the bit from the left shift control element 37(15)(L)(4), which, as noted above in connection with (d), corresponds to the data bit from bit position D0 of the original data word, as the bit in bit position Z15 of the rearranged data word. Since, in this example, the mask word will comprise set mask bits in bit positions M0 through M14 and a clear mask bit in bit position M15, the expected rearranged data word will consist of data bits in bit positions D1 through D15 shifted into bit positions Z0 through Z14 of the rearranged data word, with the data bit in bit position D0 shifted into bit position Z15 of the rearranged data word, and, as shown above in connection with (a) through (d), the data bit in bit position D0 of the original data word will indeed be shifted into the bit position Z15 of the rearranged data word. From the above, it will be apparent to those skilled in the art that the functional unit 10 will also effect shifts, into a respective column 30(k), of a data bit from another column 30(k') or 30(k") to the left or right, of the appropriate numbers of columns k–k' or k"–k, for other patterns of mask bits and for other columns 30(k), 30(k') and 30(k"), even though the control signals which control the total displacement may be generated for and used in controlling shifts for other columns.

A specific example will serve to illustrate the operation of the functional unit 10. In this example, the mask word is "0 1 1 0 0 0 0 1 0 1 0 0 1 0 1 0" and the data word will be "a b c d e f g h i j k l m n o p," where each letter in the data word represents a binary digit. It will be apparent that, with such a mask word, the rearranged data word is expected to be "a k l b c d e m f n g h o i p j." In that case, the values generated by the adders are:

$$
\begin{array}{cccccccccccccccc}
1 & 2 & 2 & 0 & 1 & 2 & 1 & 1 & 2 & 1 & & & & & & (1)\\
2 & 2 & 2 & 2 & 3 & 2 & 2 & 3 & 4 & 4 & 3 & 2 & & & &\\
3 & 3 & 4 & 4 & 4 & 5 & 5 & 6 & 9 & 9 & 9 & 8 & 7 & 6 & 5 & 5
\end{array}
$$

From (1), the values which identify the number of bits of the mask word to the left of the respective bit positions M1 through M15 which are set comprise:

$$
\begin{array}{l}
0 \\
1\ 2 \\
2\ 2\ 2\ 2 \\
3\ 3\ 4\ 4\ 4\ 5\ 5\ 6
\end{array} \quad (2)
$$

which, if laid out in a line corresponding to the bit positions M1 through M15 for which they represent counts provides:

$$
-\ 0\ 1\ 2\ 2\ 2\ 2\ 2\ 3\ 3\ 4\ 4\ 4\ 5\ 5\ 6 \qquad (3)
$$

(where the dash "-" indicates that no count is provided for bit position M0) which, in turn, comprise the shift values for the left shift series 31(n)(L) of the respective shift columns 30(n).

Similarly, from (1), the values which identify the number of bits of the mask word to the right of the respective bit positions M14 through M0 which are set comprise:

$$\begin{array}{ccccccccccccccc}
 & & & & & & & & & & & & & 1 & \\
 & & & & & & & & & & & & 2 & 1 & \\
 & & & & & & & & & & 4 & 4 & 3 & 2 & \\
 & & & & & & 9 & 9 & 9 & 8 & 7 & 6 & 5 & 5 &
\end{array} \quad (4)$$

which, if laid out in a line corresponding to the bit positions M0 through M14 for which they represent counts, provides:

$$9\ 9\ 9\ 8\ 7\ 6\ 5\ 5\ 4\ 4\ 3\ 2\ 2\ 1\ 1\ -\quad (5)$$

(where the dash "-" indicates that no count is provided for bit position M15) which, in turn, comprise the shift values for the right shift series 31(n)(R) of the respective shift columns 30(n).

Expressing the counts in (3) in binary, to illustrate the binary-encoded values represented by the respective signals, where the least significant digit is at the top and the most significant at the bottom:

$$\begin{array}{l}
-\ 0\ 1\ 0\ 0\ 0\ 0\ 0\ 1\ 1\ 0\ 0\ 0\ 1\ 1\ 0 \quad (X1\text{-}xx) \\
-\ -\ 0\ 1\ 1\ 1\ 1\ 1\ 1\ 1\ 0\ 0\ 0\ 0\ 0\ 1 \quad (X2\text{-}xx) \\
-\ -\ -\ -\ 0\ 0\ 0\ 0\ 0\ 0\ 1\ 1\ 1\ 1\ 1\ 1 \quad (X3\text{-}xx) \\
-\ -\ -\ -\ -\ -\ -\ -\ 0\ 0\ 0\ 0\ 0\ 0\ 0\ 0 \quad (X4\text{-}xx)
\end{array} \quad (6)$$

which, in turn, represent the "X" signals applied to the shift elements of the left shift series of the respective columns 30(n), with "xx" ranging from "01" (the leftmost column) through "15" (the second rightmost column)

Similarly, expressing the counts in (5) in binary, $$\begin{array}{l}
1\ 1\ 1\ 0\ 1\ 0\ 1\ 1\ 0\ 0\ 1\ 0\ 0\ 1\ 1\ - \quad (Y1\text{-}xx) \\
0\ 0\ 0\ 0\ 1\ 1\ 0\ 0\ 0\ 0\ 1\ 1\ 1\ 0\ -\ - \quad (Y2\text{-}xx) \\
0\ 0\ 0\ 0\ 1\ 1\ 1\ 1\ 1\ 1\ 0\ 0\ -\ -\ -\ - \quad (Y3\text{-}xx) \\
1\ 1\ 1\ 1\ 0\ 0\ 0\ 0\ -\ -\ -\ -\ -\ -\ -\ - \quad (Y4\text{-}xx)
\end{array} \quad (7)$$

which, in turn, represent the "Y" signals applied to the shift elements of the right shift series of the respective columns 30(n), with "xx" ranging from "01" (the second rightmost column) through "15" (the leftmost column).

As noted above, the values depicted in (7) represent the signals applied to the shift elements successive shift stages 34(s) of the respective columns 30(n) comprising the left shift series. The inputs to, and outputs from, those shift elements, using the values depicted in (7) to represent the signals, comprise:

$$\begin{array}{llllllllllllllll}
a & b & c & d & e & f & g & h & i & j & k & l & m & n & o & p & \text{(shift stage 33(0))} \\
a & b & c & d & e & f & g & h & i & j & k & l & m & n & o & p & \text{(shift stage 33(1))} \\
a & b & c & d & e & f & g & h & i & j & g & h & i & k & k & l & \text{(shift stage 33(2))} \\
a & b & c & b & c & d & e & f & g & h & g & h & i & k & k & j & \text{(shift stage 33(3))} \\
a & b & b & b & c & d & e & f & f & g & g & h & i & i & j & j & \text{(shift stage 33(4))}
\end{array} \quad (8)$$

Similarly, the inputs to, and outputs from, the right shift elements, using the values depicted in (7) to represent the signals, comprise:

$$\begin{array}{llllllllllllllll}
a & b & c & d & e & f & g & h & i & j & k & l & m & n & o & p & \text{(shift stage 33(0))} \\
i & j & k & l & e & f & g & h & i & j & k & l & m & n & o & p & \text{(shift stage 33(1))} \\
i & j & k & l & i & j & k & l & m & n & k & l & m & n & o & p & \text{(shift stage 33(2))} \\
i & j & k & l & k & l & k & l & m & n & m & n & o & n & o & p & \text{(shift stage 33(3))} \\
j & k & l & l & l & l & l & m & m & n & n & n & o & o & p & p & \text{(shift stage 33(4))}
\end{array} \quad (9)$$

The last lines of (8) and (9) represent the outputs of the last shift stages 34(S) of the left and right shift series 31(n)(L) and 31(n)(R), respectively. Each output multiplexer 32(n) selectively couples one or the other output as the respective rearranged data bit based on the value of the respective mask bit in bit position Mn in the "n-th" bit position of the mask word, as follows:

$$\begin{array}{llllllllllllllll}
a & b & b & b & c & d & e & f & f & g & g & h & i & i & j & j & \text{(from (8))} \\
j & k & l & l & l & l & l & m & m & n & n & n & o & o & p & p & \text{(from (9))} \\
0 & 1 & 1 & 0 & 0 & 0 & 0 & 1 & 0 & 1 & 0 & 0 & 1 & 0 & 1 & 0 & \text{(mask word)} \\
a & k & l & b & c & d & e & m & f & n & g & h & o & i & p & j & \text{(rearranged word Zn)}
\end{array} \quad (10)$$

as expected.

Figure 2A:
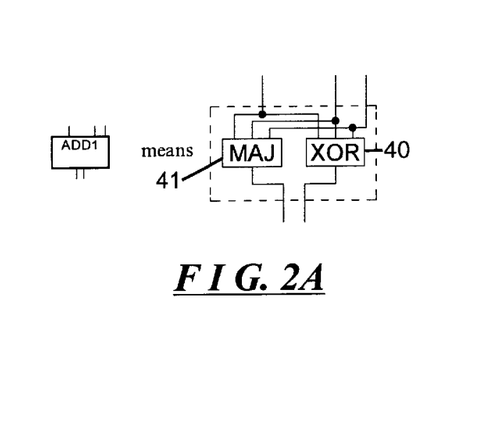
FIGS. 2A through 2D depict logical implementations of various circuit elements depicted in FIG. 1A.

As noted above, FIG. 2, comprising FIGS. 2A through 2D, depict circuits for the adders A1-xx, A2-xx and A3-xx used in one embodiment of the invention. Each adder A1-xx receives three input signals, each representing a binary-encoded value, and generates two output signals representing a single binary-encoded value. As noted above, each input signal received by an adder A1-n represents a value indicating whether a mask bit in bit position Mn−1, Mn or Mn+1 is set or clear, and the value generated by adder A1-n indicates the number of those mask bits which are set or clear. As shown in FIG. 2A, the adder A1-xx comprises an XOR gate 40 and a majority circuit 41. The XOR gate 40 generates an asserted signal, representing the value "one," if one or three of the input signals are asserted, and a negated signal, representing the value "zero," if zero or two of the input signals are asserted. The majority circuit 41 generates an asserted signal if two or three of the input signals are asserted, and a negated signal if zero or one of the input signals is asserted. It will be appreciated that the output signal generated by the majority circuit 41 represents the high-order digit in the two-digit value generated by the adder A1-xx, and the output signal generated by the XOR gate represents the low-order digit in the two-digit value generated by the adders A1-xx.

Figure 2B:
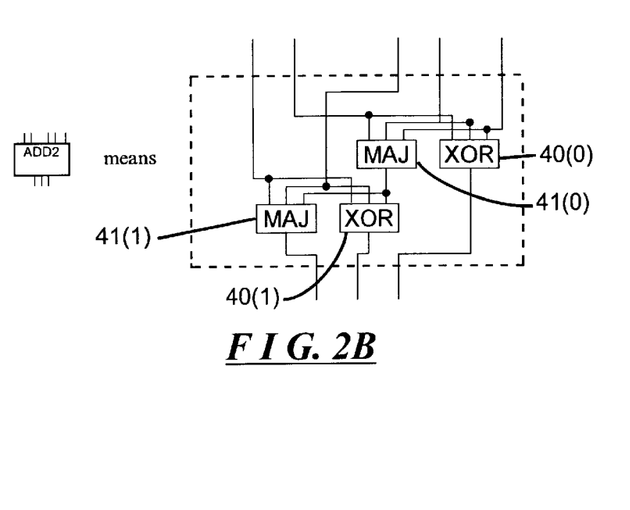
Figure 2C:
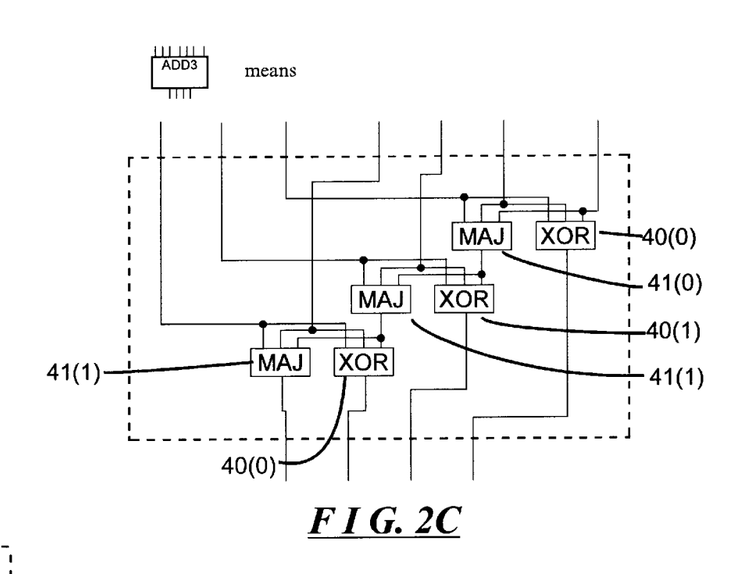

Similarly, each adder A2-xx receives three inputs, each representing a binary-encoded value, and generates three output signals representing a single binary-encoded value. The three inputs comprise two two-bit binary encoded values and a one-bit binary encoded value. As shown in FIG. 2B, the adder A2-xx comprises two XOR gates 50(0) and 50(1) and two majority circuits 51(0) and 51(1). The XOR gate 50(0) and majority circuit 51(0) receive signals representing the low-order digits of the binary-encoded input values and generate, respectively, signals representing the low-order and high-order digits of the sum of those digits, in a manner similar to that described above in connection with FIG. 2A. In adder A2-xx, the output signal generated by the majority circuit 51(0) effectively represents a carry digit which is coupled to the XOR gate 50(1) and majority circuit 51(1). The XOR gate 50(1) and majority circuit 51(1) also receive signals representing the high-order digits of the two two-digit values and from those signals and the signal from majority circuit 51(0) representing the carry digit, generate signals representing respective low- and high-order digits in a manner similar to that described above in connection with FIG. 2A. Accordingly, the signal generated by XOR gate 50(0) represents the low-order digit in the value generated by adder A2-xx, the signal generated by XOR gate 50(1) represents the intermediate-order digit and the signal generated by majority circuit 51(1) represents the high-order digit.

In addition, each adder A3-xx receives three inputs, each representing a binary-encoded value, and generates four output signals representing a single binary-encoded value. The three inputs comprise two three-bit binary encoded values and a one-bit binary encoded value. As shown in FIG. 2B, the adder A2-xx comprises three XOR gates 60(0), 60(1) and 60(2) and three majority circuits 61(0), 61(1) and 61(2). The XOR gate 60(0) and majority circuit 61(0) receive signals representing the low-order digits of the binary-encoded input values and generate, respectively, signals representing the low-order and high-order digits of the sum of those digits, in a manner similar to that described above in connection with FIG. 2A. In adder A3-xx, the output signal generated by the majority circuit 61(0) effectively represents a carry digit which is coupled to the XOR gate 60(1) and majority circuit 61(1). The XOR gate 60(1) and majority circuit 61(1) also receive signals representing the intermediate-order digits of the two three-digit values and from those signals and the signal from majority circuit 61(0) representing the carry digit, generate signals representing respective low- and high-order digits in a manner similar to that described above in connection with FIG. 2A. The high-order digit from majority circuit 61(1) also represents a carry digit which is coupled to the XOR gate 60(2) and majority circuit 61(2), which also operate in a manner similar to that described above in connection with FIG. 2A to generate respective low- and high-order digits. Accordingly, the signal generated by XOR gate 60(0) represents the low-order digit in the value generated by adder A3-xx, the signal generated by XOR gate 60(1) represents the second-low-order digit, the signal generated by the XOR gate 60(2) represents the third-low-order (or second-high-order) digit and the signal generated by majority circuit 61(2) represents the high-order digit of the four-digit value generated by adder A3-xx.

Figure 2D:
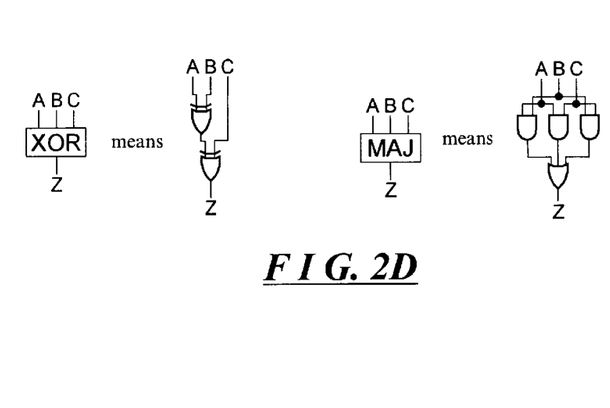

Illustrative logic circuits for the XOR and majority circuits are depicted in FIG. 2D. Their operation will be apparent to those skilled in the art and will not be described further herein.

The invention provides a number of advantages. In particular, the invention provides a functional unit for efficiently executing a "mingle" instruction, in which bits in bit positions Dn of a data word are rearranged according to bits in bit positions Mn of a mask word, so that (i) the bits in bit positions D0, . . . , Dn of the data word in bit positions towards the left end of a the data word are distributed to bit positions Zn in the rearranged data word which correspond to bit positions of the mask whose bits are clear, or have the value "zero," and (ii) the bits in bit positions Dn+1, . . . , DN−1 of the data word in bit positions to the right end of the data word are distributed to bit positions Zn in the rearranged data word which correspond to bit positions of the mask whose bits are set, while maintaining order of the bits of the data word in each group.

It will be appreciated that a number of modifications may be made to the functional unit described above in connection with FIGS. 1 and 2. For example, it will be apparent that the functional unit can readily be modified to operate so that the data bits associated with the mask bits which are set are shifted to the left and the data bits associated with the mask bits which are clear are shifted to the right by changing the group of adders whose inputs are complemented and having the inverter 20 provided for the M0 mask bit instead of the M15 mask bit. In addition, it will be appreciated that the mask bits in bit positions Mn for which the data bits are set to zero will comprise the mask bits in bit positions Mn which are set, by providing that the AND gates 35(n) are connected to control the shifting of the data bits into the right shift series 31(n) in each column 30(n).

Furthermore, although the invention has been described in connection with rearranging portions of a data word comprising single-bit units, each associated with a bit of the mask word, it will be apparent that the invention can be used in connection with rearranging multi-bit data word units, with each unit being associated with a bit of the mask word. In that case, each of the gates and multiplexers in the shift element 12 will receive, instead of a single bit, the corresponding multi-bit portion and provide as an output a corresponding multi-bit portion.

In addition, although the functional unit has been described as rearranging a sixteen bit data word Dn according to the bits of a sixteen bit mask word Mn, it will be appreciated that the functional unit may be readily extended to rearrange a data word of any size.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. For producing from input signals representing an input data word and a mask word an output signal representing an output data word, the input and output data words comprising N data units $D_n$, and $Z_n$, respectively, where n=0, 1, 2, . . . , N−1, the mask word comprising, for each data unit $Z_n$ and thereby for the corresponding data unit $D_n$, a separate mask bit $M_n$ associated therewith that assumes one of a right-indicating value and a left-indicating value, a mingle circuit comprising:

A) a control module configured to compute, for each mask bit $M_n$ such that n<N−1, a right-sum output representing the number $R_n$ of mask bits $M_k$ such that k>n that have the left-indicating value; and B) a shift module, responsive to the mask word and the right-sum outputs, for providing, as each data unit $Z_n$ such that $M_n$ has the right-indicating value, the data unit $D_d$ such that $d=n+R_n$.

2. A mingle circuit as defined in claim 1 wherein the shifter module comprises, for each data unit $Z_n$ in the output data word, a respective shift column $C_n$ associated therewith and thereby with the respective mask bit $M_n$ and the respective data unit $D_n$ in the input data word, each shift column $C_n$ including:

A) a selection element, which receives left and right selection-element inputs and responds to mask bit $M_n$ by providing as $Z_n$:
  i) the left selection-element input when $M_n$ has the left-indicating value; and
  ii) the right selection-element input when $M_n$ has the right-indicating value; and B) a right series of J shift elements $S_j$, where $1 \leq j \leq J$, each shift element $S_j$ being connected to receive a respective pass input, providing a respective shift-element output, and being associated with a respective shift value $s_j$ such that for, $$j < J, s_j > \sum_{k=j+1}^{J} s_k,$$

wherein:
  i) shift element $S_1$ receives $D_n$ as its pass input;
  ii) each other shift element $S_j$ receives, as its pass input, the output of shift element $S_{j-1}$ in the same series;
  iii) shift element $S_J$ applies its shift-element output to the selection element as the selection element's right selection-element input;
  iv) each shift element $S_j$ comprises one of:
    a) a pass element, which provides $S_j$'s input as its output; and
    b) a multiplexer that:
      (1) receives as its shift input:
        (a) if j=1, the input word's data unit $D_d$, where $d=n+s_j$; and
        (b) otherwise, the output of the shift element $S_{j-1}$ in the right series of column $C_d$, where $d=n+s_j$;
      (2) makes a choice between its inputs in accordance with the value of $R_n$; and
      (3) forwards its input thus chosen as $S_j$'s output; and
  v) each multiplexer so makes its choice in response to $R_n$ that the sum of the shift values $s_j$ associated with the multiplexers that choose their shift inputs is $R_n$.

3. A mingle circuit as defined in claim 2 wherein $s_j=2^{J-j}$.

4. A mingle circuit as defined in claim 2 wherein:

A) each of the right-sum outputs representing a number $R_n$ of mask bits comprises a sum bit $b_j$ for at least each non-negative integer j such that $j \leq K$, where K is the smallest integer such that $$N - n - 1 \leq \sum_{j=1}^{K} s_{J-j+1};$$

B) the values of the bits $b_j$ representing a given value $R_n$ are such that $$R_n = \sum_{j=1}^{J} b_j s_{J-j+1};$$

and

C) each multiplexer in a shift element $S_j$ in the right series of shift elements in shift column $C_n$ bases the choice between its inputs only on the sum bit $b_j$ in the right-sum output representing $R_n$.

5. A mingle circuit as defined in claim 2 wherein, in the right series of shift elements in shift column $C_n$, each shift element $S_j$ such that $n<N-s_j$ comprises one of the multiplexers.

6. A mingle circuit as defined in claim 5 wherein, in the right series of shift elements in shift column $C_n$, each shift element $S_j$ such that $n \geq N-s_j$ comprises one of the pass elements.

7. A mingle circuit as defined in claim 6 wherein, in at least a first mode of operation thereof:

A) the control module is additionally configured to compute, for each mask bit $M_n$ such that n>0, a left-sum output representing the number $L_n$ of mask bits $M_k$ such that k<n that have the right-indicating value; and B) the shift module is responsive to the mask word and the left-sum outputs to for providing, as each data unit $Z_n$ such that $M_n$ has the left-indicating value, the respective data unit $D_d$ such that $d=n-L_n$.

8. A mingle circuit as defined in claim 7 wherein the mingle circuit is also operable in a second mode of operation, in which the shift module provides a common data-unit value as each data unit $Z_n$ such that $M_n$ has the left-indicating value.

9. A mingle circuit as defined in claim 7 wherein the shifter module comprises, for each data unit $Z_n$ in the output data word, a respective shift column $C_n$ associated therewith and thereby with the respective mask bit $M_n$ and the respective data unit $D_n$ in the input data word, each shift column $C_n$ including:

A) a selection element, which receives left and right selection-element inputs and responds to mask bit $M_n$ by providing as $Z_n$:
  i) the left selection-element input when $M_n$ has the left-indicating value; and
  ii) the right selection-element input when $M_n$ has the right-indicating value; and B) a right series of J shift elements $S_j$, where $1 \leq j \leq J$, each shift element $S_j$ being connected to receive a respective pass input, providing a respective shift-element output, and being associated with a respective shift value $s_j$ such that, for $$j < J, s_j > \sum_{k=j+1}^{J} s_k,$$

wherein:
  i) shift element $S_1$ receives $D_n$ as its pass input;
  ii) each other shift element $S_j$ receives, as its pass input, the output of shift element $S_{j-1}$ in the same series;

iii) shift element $S_j$ applies its shift-element output to the selection element as the selection element's right selection-element input;
iv) each shift element $S_j$ comprises one of:
a) a pass element, which provides $S_j$'s input as its output; and
b) a multiplexer that:
(1) receives as its shift input:
(a) if j=1, the input word's data unit $D_d$, where $d=n+s_j$; and
(b) otherwise, the output of the shift element $S_{j-1}$ in the right series of column $C_d$, where $d=n+s_j$;
(2) makes a choice between its inputs in accordance with the value of $R_n$; and
(3) forwards its input thus chosen as $S_j$'s output; and
v) each multiplexer so makes its choice in response to $R_n$ that the sum of the shift values $s_j$ associated with the multiplexers that choose their shift inputs is $R_n$.

10. A mingle circuit as defined in claim 9 wherein each shift column $C_n$ additionally includes a left series of J shift elements $S_j$, where $1 \leq j \leq J$, each shift element $S_j$ being connected to receive a respective pass input, providing a respective shift-element output, and being associated with a respective shift value $s_j$ such that, for $$j < J, s_j > \sum_{k=j+1}^{J} s_k,$$

wherein:
A) in at least the first mode of operation, shift element $S_1$ receives $D_n$ as its pass input;
B) each other shift element $S_j$ receives, as its pass input, the output of shift element $S_{j-1}$ in the same series;
C) shift element $S_j$ applies its shift-element output to the selection element as the selection element's left selection-element input;
D) each shift element $S_j$ comprises one of:
i) a pass element, which provides $S_j$'s input as its output; and
ii) a multiplexer that:
a) receives as its shift input:
(1) if j=1, the input word's data unit $D_d$ in the first mode of operation, where $d=n-s_j$; and
(2) if j>1, the output of the shift element $S_{j-1}$ in the left series of column $C_d$, where $d=n-s_j$;
b) makes a choice between its inputs in accordance with the value of $L_n$; and
c) forwards its input thus chosen as $S_j$'s output; and
E) each multiplexer so makes its choice in response to $L_n$ that the sum of the shift values $s_j$ associated with the multiplexers whose choices are their shift inputs is $L_n$.

11. A mingle circuit as defined in claim 10 wherein:
A) each of the left-sum outputs representing a number value $L_n$ of mask bits comprises a sum bit $b_j$ for at least each non-negative integer j such that $j \leq K$, where K is the smallest integer such that $$n \leq \sum_{j=1}^{K} s_{J-j+1};$$

B) the values of the bits $b_j$ representing a given value $L_n$ are such that $$L_n = \sum_{j=1}^{J} b_j s_{J-j+1};$$

and
C) each multiplexer in a shift element $S_j$ in the left series of shift elements in shift column $C_n$ bases the choice between its inputs only on the sum bit $b_j$ in the left-sum output representing $L_n$.

12. A mingle circuit as defined in claim 11 wherein $s_j=2^{J-j}$.

13. A mingle circuit as defined in claim 11 wherein:
A) each of the right-sum outputs representing a number $R_n$ of mask bits comprises a sum bit $b_j$ for at least each non-negative integer j such that $j \leq K$, where K is the smallest integer such that $$N-n-1 \leq \sum_{j=1}^{K} s_{J-j+1};$$

B) the values of the bits $b_j$ representing a given value $R_n$ are such that $$R_n = \sum_{j=1}^{J} b_j s_{J-j+1};$$

and
C) each multiplexer in a shift element $S_j$ in the right series of shift elements in shift column $C_n$ bases the choice between its inputs only on the sum bit $b_j$ in the right-sum output representing $R_n$.

14. A mingle circuit as defined in claim 13 wherein, in the right series of shift elements in shift column $C_n$, each shift element $S_j$ such that $n<N-s_j$ comprises one of the multiplexers.

15. A mingle circuit as defined in claim 14 wherein, in the left series of shift elements in shift column $C_n$, each shift element $S_j$ such that $n \geq s_j$ comprises one of the multiplexers.

16. A mingle circuit as defined in claim 15 wherein, in the right series of shift elements in shift column $C_n$, each shift element $S_j$ such that $n \geq N-s_j$ comprises one of the pass elements.

17. A mingle circuit as defined in claim 16 wherein, in the left series of shift elements in shift column $C_n$, each shift element $S_j$ such that $n<s_j$ comprises one of the pass elements.

18. A mingle circuit as defined in claim 10 wherein:
A) the mingle circuit further comprises an input stage that is operable in first and second modes of operation;
B) in the first mode of operation, the input stage applies the input data word's data units $D_n$ to respective shift columns $C_n$ as the pass inputs of the shift elements $S_1$ in the left series thereof; and
C) in the second mode of operation, the input stage applies a common data-unit value to all of the shift columns $C_n$ as the pass inputs of the shift elements $S_1$ in the left series thereof.

19. A mingle circuit as defined in claim 1 wherein each of the data units is a single bit.

20. For producing an output data word from an input data word in accordance with a mask word, the input and output data words comprising N data units $D_n$ and $Z_n$, respectively, where n=0, 1, 2, ..., N-1, the mask word comprising, for each data unit $Z_n$ and thereby for the corresponding data unit $D_n$, a separate mask bit $M_n$ associated therewith that assumes one of a right-indicating value and a left-indicating value, a mingle circuit comprising:

A) means for computing, for each mask bit $M_n$ such that $n<N-1$, a right-sum output representing the number $R_n$ of mask bits $M_k$ such that $k>n$ that have the left-indicating value; and B) means for providing in response to the mask word and the right-sum out-puts, as each data unit $Z_n$ such that $M_n$ has the right-indicating value, the data unit $D_d$ such that $d=n+R_n$.

21. A mingle circuit as defined in claim 20 further comprising:

A) means for computing, for each mask bit $M_n$ such that $n>0$, a left-sum output representing the number $L_n$ of mask bits $M_k$ such that $k<n$ that have the right-indicating value; and B) means for providing in response to the mask word and the left-sum out-puts, as each data unit $Z_n$ such that $M_n$ has the right-indicating value, the data unit $D_d$ such that $d=n-L_n$.

22. For producing an output data word from an input data word in accordance with a mask word, the input and output data words comprising N data units $D_n$, and $Z_n$, respectively, where $n=0, 1, 2, \ldots, N-1$, the mask word comprising, for each data unit $Z_n$ and thereby for the corresponding data unit $D_n$, a separate mask bit $M_n$ associated therewith that assumes one of a right-indicating value and a left-indicating value, a method comprising:

A) generating a right-sum output for each integer n such that $n<N-1$ by counting the number $R_n$ of mask bits $M_k$ such that $k>n$ that have the left-indicating value and providing as that right-sum output an output that represents $R_n$; and B) for each integer n such that $M_n$ has the right-indicating value, generating $Z_n$ by forwarding thereas, in response to the corresponding right-sum out-put, the data unit $D_d$ such that $d=n+R_n$.

23. A method as defined in claim 22 further comprising:

A) generating a left-sum output for each integer n such that $n>0$ by counting the number $L_n$ of mask bits $M_k$ such that $k<n$ that have the right-indicating value and providing as that left-sum output an output that represents $L_n$; and B) for each integer n such that $M_n$ has the left-indicating value, generating $Z_n$ by forwarding thereas, in response to the corresponding left-sum output, the data unit $D_d$ such that $d=n-L_n$.

* * * * *

UNITED STATES PATENT AND TRADEMARK OFFICE
CERTIFICATE OF CORRECTION

PATENT NO.    : 6,629,239 B1
DATED         : September 30, 2003
INVENTOR(S)   : Steele, Jr.

It is certified that error appears in the above-identified patent and that said Letters Patent is hereby corrected as shown below:

Title page,
Item [54], Title, replace "SYSTEM AND METHOD FOR UNPACKING AND MERGING BITS OF A DATA WORLD IN ACCORDANCE WITH BITS OF A MASK WORD" with -- SYSTEM AND METHOD FOR UNPACKING AND MERGING BITS OF A DATA WORD IN ACCORDANCE WITH BITS OF A MASK WORD --

Column 1,
Line 9, replace "No. 09/545,020, which was filed on Apr. 7, 2002 by Guy L." with -- No. 09/545,020, which was filed on Apr. 7, 2000 by Guy L. --

Signed and Sealed this

Ninth Day of March, 2004

JON W. DUDAS
*Acting Director of the United States Patent and Trademark Office*